US009704671B2

(12) United States Patent
Cheng et al.

(10) Patent No.: US 9,704,671 B2
(45) Date of Patent: Jul. 11, 2017

(54) LUMINOUS KEYBOARD

(71) Applicants: Ming-Tsang Cheng, Hsin-Chu (TW); Kuo-Hsin Chen, Hsin-Chu (TW); Chih-Jen Tsang, Hsin-Chu (TW)

(72) Inventors: Ming-Tsang Cheng, Hsin-Chu (TW); Kuo-Hsin Chen, Hsin-Chu (TW); Chih-Jen Tsang, Hsin-Chu (TW)

(73) Assignee: Young Lighting Technology Inc., Hsin-Chu (TW)

(*) Notice: Subject to any disclaimer, the term of this patent is extended or adjusted under 35 U.S.C. 154(b) by 274 days.

(21) Appl. No.: 14/324,255

(22) Filed: Jul. 7, 2014

(65) Prior Publication Data

US 2015/0036314 A1 Feb. 5, 2015

(30) Foreign Application Priority Data

Aug. 2, 2013 (TW) ............................. 102127840 A

(51) Int. Cl.
*G01D 11/28* (2006.01)
*H01H 13/83* (2006.01)

(52) U.S. Cl.
CPC ....... *H01H 13/83* (2013.01); *H01H 2219/044* (2013.01); *H01H 2219/056* (2013.01);
(Continued)

(58) Field of Classification Search
CPC ............. H01H 13/83; H01H 2219/044; H01H 2219/056; H01H 2219/06; H01H 2219/062; H01H 2219/064
(Continued)

(56) References Cited

U.S. PATENT DOCUMENTS

| | | | | |
|---|---|---|---|---|
| 7,891,829 B2 * | 2/2011 | Takeda | G06F 3/0202 | 200/314 |
| 2004/0257829 A1 * | 12/2004 | Suwa | G06F 3/0202 | 362/555 |

(Continued)

FOREIGN PATENT DOCUMENTS

| | | |
|---|---|---|
| CN | 101192478 | 6/2008 |
| CN | 101859182 | 10/2010 |

(Continued)

OTHER PUBLICATIONS

"Office Action of China Counterpart Application," issued on Dec. 24, 2015, p. 1-p. 7.

(Continued)

*Primary Examiner* — Tsion Tumebo
(74) *Attorney, Agent, or Firm* — Jianq Chyun IP Office

(57) ABSTRACT

A luminous keyboard includes a light guide layer, a light source, a reflecting layer, a circuit layer, a key fixing plate, mechanical keys, and microstructures. The light guide layer has a first surface, a second surface, and a light incident surface. The light source generates a light beam to the light guide layer through the light incident surface. The reflecting layer is disposed beside the first surface of the light guide layer. The circuit layer formed on the second surface of the light guide layer has multiple switches. The key fixing plate is fixed to the second surface of the light guide layer. The mechanical keys are connected to the key fixing plate, corresponding to the switches, and are pressed to trigger the corresponding switches. The microstructures disposed on the light guide layer surround the switches, and guide the light beam from the light guide layer to the mechanical keys.

9 Claims, 2 Drawing Sheets

(52) U.S. Cl.
CPC ... *H01H 2219/06* (2013.01); *H01H 2219/062* (2013.01); *H01H 2219/064* (2013.01)

(58) Field of Classification Search
USPC ........................................ 362/23.03; 345/170
See application file for complete search history.

(56) References Cited

U.S. PATENT DOCUMENTS

| | | | | |
|---|---|---|---|---|
| 2009/0067153 | A1* | 3/2009 | Takeda .................. | G06F 3/0202 362/85 |
| 2009/0128496 | A1* | 5/2009 | Huang .................. | G06F 3/0202 345/170 |
| 2011/0278145 | A1* | 11/2011 | Takeda ................... | H01H 13/83 200/314 |
| 2012/0055770 | A1* | 3/2012 | Chen ...................... | H01H 13/83 200/310 |
| 2013/0170246 | A1 | 7/2013 | Chen | |
| 2013/0286631 | A1* | 10/2013 | Chen ..................... | G06F 3/0202 362/23.03 |

FOREIGN PATENT DOCUMENTS

| | | |
|---|---|---|
| CN | 201608079 U | 10/2010 |
| CN | 202142456 | 2/2012 |
| CN | 102568901 | 7/2012 |
| TW | M321552 | 11/2007 |
| TW | 201015602 | 4/2010 |
| TW | 201145333 | 12/2011 |
| TW | 201145334 | 12/2011 |
| TW | 201216311 | 4/2012 |
| TW | M432884 | 7/2012 |
| TW | 201303942 | 1/2013 |
| TW | 201310279 | 3/2013 |
| TW | 201312388 | 3/2013 |
| TW | I394192 | 4/2013 |
| TW | M449996 | 4/2013 |
| TW | 201324568 | 6/2013 |
| TW | M454573 | 6/2013 |

OTHER PUBLICATIONS

"Office Action of Taiwan Counterpart Application" , issued on Dec. 24, 2014, p. 1-p. 7.

* cited by examiner

LUMINOUS KEYBOARD

CROSS-REFERENCE TO RELATED APPLICATION

This application claims the priority benefit of Taiwan application serial no. 102127840, filed on Aug. 2, 2013. The entirety of the above-mentioned patent application is hereby incorporated by reference herein and made a part of this specification.

BACKGROUND OF THE INVENTION

Field of the Invention

The invention relates to a keyboard, and particularly relates to a luminous keyboard.

Description of Related Art

In the current use of computers, keyboards are one of the indispensable input devices for inputting texts, symbols, or numbers. With the increasing popularity of computers, the development of keyboards nowadays not only focuses on the input function but emphasizes on the visual effect. Therefore, a keyboard that is luminous when in use becomes a new trend of development for keyboard manufacturers.

To make each key on a keyboard luminous, luminous keyboards additionally include a backlight module or a bottom light source at the bottom, as compared to conventional keyboards. In addition, caps of keys on the keyboard are made of a transparent or light-transmissive material, such that the light generated by the light source under the caps illuminates the caps to achieve the luminous effect of the keyboard.

Since the luminous keyboards additionally include a backlight module or a bottom light source compared to the conventional keyboards, the thickness of the luminous keyboards is thicker than that of the conventional keyboards. Besides, the development of electronic devices that use keyboards, such as portable devices (e.g. laptops), continuously pursues lightness and thinness. Therefore, it is an important research issue to effectively reduce the thickness of keyboards while maintain the characteristics of luminous keyboards at the same time.

Patents related to luminous keyboards include Taiwan Patent Nos. TWM454573U1, TW201145334A1, TW201145333A1, TWI394192B1, TWM449996U1, TW201324568A1, TW201312388A1, TW201310279A1, and TW201216311A1, China Patent Nos. CN202142456U and CN201608079U, and U.S. Patent No. US20130170246A1. In addition, patent related to touch panel includes Taiwan Patent No. TWM432884U1.

SUMMARY OF THE INVENTION

The invention provides a luminous keyboard that illuminates keys of the keyboard at a dark place.

Other objects and advantages of the invention can be further understood by the technical features broadly embodied and described as follows.

In order to achieve at least one of the above objects or other objectives, an embodiment of the invention provides a luminous keyboard, including a light guide layer, a light source, a reflecting layer, a circuit layer, a key fixing plate, a plurality of mechanical keys, and a plurality of microstructures. The light guide layer has a first surface, a second surface opposite to the first surface, and a light incident surface connecting the first surface and the second surface. The light source is disposed beside the light incident surface and generates a light beam to the light guide layer through the light incident surface. The reflecting layer is disposed beside the first surface of the light guide layer. The circuit layer is formed on the second surface of the light guide layer and has a plurality of switches. The key fixing plate is fixed to the second surface of the light guide layer. The mechanical keys are connected to the key fixing plate and disposed on the switches, and each of the mechanical keys triggers the corresponding switch when being pressed. The microstructures are located on the light guide layer and surround the switches, so as to guide the light beam in the light guide layer to the mechanical keys.

In an embodiment of the invention, the luminous keyboard further includes a light-shielding layer disposed between the light guide layer and the key fixing plate, the light-shielding layer has a plurality of openings to allow the light beam emitted from the light guide layer to pass through.

In an embodiment of the invention, a material of the microstructures includes a transparent material and a plurality of scattering particles distributed in the transparent material.

In an embodiment of the invention, a material of the circuit layer and the microstructures includes a transparent conductive material and a plurality of scattering particles distributed in the transparent conductive material.

In an embodiment of the invention, the microstructures include a plurality of concave or convex microstructures located on the second surface of the light guide layer.

In an embodiment of the invention, a material of the light guide layer includes a macromolecular compound or glass.

In an embodiment of the invention, a material of the light guide layer includes polymethylmethacrylate (PMMA) or polycarbonate (PC).

In an embodiment of the invention, a material of the circuit layer includes a conductive silver paste, indium-tin-oxide (ITO), or a conductive resin.

In an embodiment of the invention, each of the mechanical keys has a cap, the cap has a light-transmissive icon, and the light beam from the light guide layer illuminates the light-transmissive icon.

Based on the above, the embodiments above of the invention at least has one of the following preferable characteristics: the support function is provided with use of the light guide layer and the key fixing plate only, so the metallic support element conventionally located below the light guide layer may be omitted, thus helping reduce the overall thickness and weight of the luminous keyboard. In addition, compared to the conventional flexible printed circuit (FPC), which is disposed on the light guide layer, the circuit layer of the invention is directly formed on the light guide layer, so the thickness and weight of at least one dielectric layer may be omitted. Furthermore, the circuit layer and microstructures may be made of the same material and formed on the light guide layer at the same time in a single step, thus helping reduce the manufacturing steps and assembling cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as “top,” “bottom,” “front,” “back,” etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of “including,” “comprising,” or “having” and variations thereof herein is meant to encompass the items listed thereafter and equivalents thereof as well as additional items. Unless limited otherwise, the terms “connected,” “coupled,” and “mounted” and variations thereof herein are used broadly and encompass direct and indirect connections, couplings, and mountings. Similarly, the terms “facing,” “faces” and variations thereof herein are used broadly and encompass direct and indirect facing, and “adjacent to” and variations thereof herein are used broadly and encompass directly and indirectly “adjacent to”. Therefore, the description of “A” component facing “B” component herein may contain the situations that “A” component directly faces “B” component or one or more additional components are between “A” component and “B” component. Also, the description of “A” component “adjacent to” “B” component herein may contain the situations that “A” component is directly “adjacent to” “B” component or one or more additional components are between “A” component and “B” component. Accordingly, the drawings and descriptions will be regarded as illustrative in nature and not as restrictive.

Figure 1:
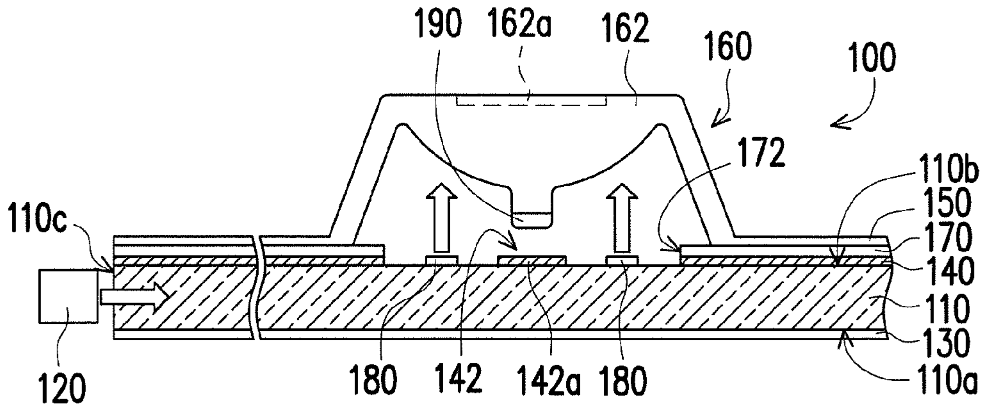
FIG. 1 is a partial sectional view of a luminous keyboard according to an embodiment of the invention.

FIG. 1 is a partial sectional view of a luminous keyboard according to an embodiment of the invention. Referring to FIG. 1, a luminous keyboard 100 of this embodiment includes a light guide layer 110 having a first surface 110*a*, a second surface 110*b* opposite to the first surface 110*a*, and a light incident surface 110*c* connecting the first surface 110*a* and the second surface 110*b*. A material of the light guide layer 110 may include glass or macromolecular compounds, such as polymethylmethacrylate (PMMA) or polycarbonate (PC). The luminous keyboard 100 further includes a light source 120. The light source 120 is disposed beside the light incident surface 110*c* of the light guide layer 110, and is capable of generating a light beam to the light guide layer 110 through the light incident surface 110*c*. The light source 120 is, for example, a light-emitting diode (LED) element. The luminous keyboard 100 further includes a reflecting layer 130. The reflecting layer 130 is disposed beside the first surface 110*a* of the light guide layer 110. In detail, The reflecting layer 130 is disposed (by adhesion, for example), on the first surface 110*a* of the light guide layer 110, and is capable of reflecting the light beam to the second surface 110*b* of the light guide layer 110. The light beam may be emitted out of the light guide layer 110 from the second surface 110*b*. Therefore, the second surface 110*b* is, for example, a light-emitting surface.

Figure 2:
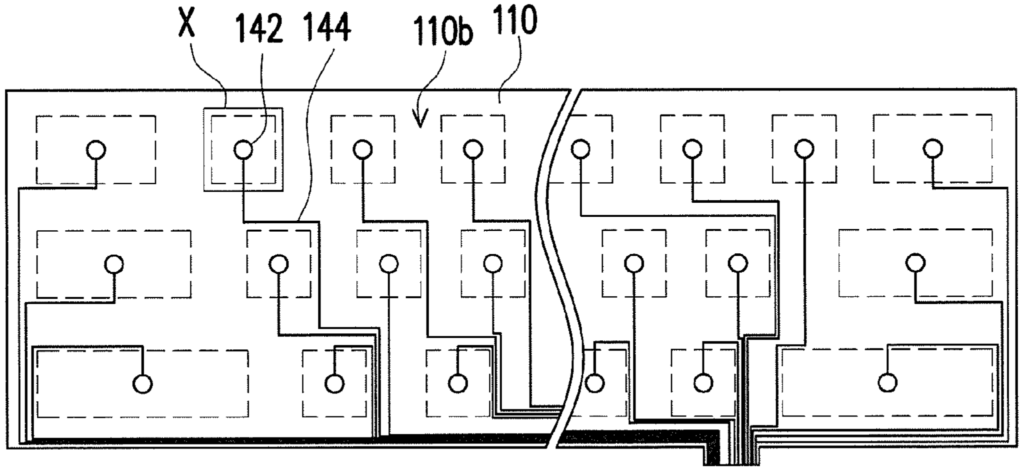
FIG. 2 is a top view of a light guide layer, a circuit layer, and microstructures of the luminous keyboard shown in FIG. 1.

FIG. 2 is a top view of a light guide layer, a circuit layer, and microstructures of the luminous keyboard shown in FIG. 1. Referring to FIGS. 1 and 2, the luminous keyboard 100 further includes a circuit layer 140. The circuit layer 140 is directly formed on the second surface 110*b* of the light guide layer 110 and includes a plurality of switches 142 and a plurality of lines 144, as shown in FIG. 2. The lines 144 are respectively connected to the switches 142. In addition, the lines 144 extend and are accumulated at the same side of the light guide layer 110 (the lower part of FIG. 2, for example), so as to be electrically connected to a circuit on a circuit board of an electronic device (not shown), thereby allowing the electronic device to receive a trigger signal of a corresponding of the switches 142 and detect a pressed location to input a corresponding text, symbol, or number.

In this embodiment, the circuit layer 140 may be directly formed on the second surface 110*b* of the light guide layer 110 by printing, lithography etching, or ink-jetting, etc. In addition, a material of the circuit layer 140 may be a conductive silver paste, indium-tin-oxide (ITO), or a conductive resin. Therefore, compared to a conventional flexible printed circuit (FPC), which is disposed on the light guide layer, the circuit layer 140 of this embodiment, which is directly formed on the light guide layer 110, may save a thickness and weight of at least one dielectric layer.

Referring to FIG. 1 again, the luminous keyboard 100 further includes a key fixing plate 150. The key fixing plate 150 is fixed (by adhesion or locking, for example) to the second surface 110*b* of the light guide layer 110. In this embodiment, a support function is provided with use of the light guide layer 110 and the key fixing plate 150 only. Namely, the light guide layer 110 is capable of supporting the key fixing plate 150 and a mechanical key 160. In this way, a metallic support element conventionally located below the light guide layer 110 may be omitted, helping reduce an overall thickness and weight of the luminous keyboard 100. In addition, if the light guide layer 110 is made of glass, the glass-made light guide layer 110 has a preferable structural strength, since glass has a higher mechanical strength. Thus, the light guide layer 110 with a thinner thickness may be used, and the overall thickness of the luminous keyboard 100 may be further reduced.

Furthermore, the luminous keyboard 100 further includes a plurality of the mechanical keys 160, although only one of the mechanical keys 160 is shown in FIG. 1 for the purpose of schematic illustration. The mechanical keys 160 are connected to the key fixing plate 150 and disposed on the switches 142, and each of the mechanical keys 160 triggers the corresponding switch 142 when being pressed. Besides, the light beam from the light guide layer 110 illuminates the mechanical keys 160. The mechanical keys 160 described herein refer to keys capable of shrinking in a predetermined path when being pressed. In this embodiment, each of the mechanical keys 160 has a cap 162 having a light-transmissive icon 162*a*. The light beam from the light guide layer 110 illuminates the light-transmissive icons 162*a* of the caps 162.

Referring to FIG. 1 again, the luminous keyboard 100 further includes a light-shielding layer 170. The light-shielding layer 170 is disposed between the light guide layer 110 and the key fixing plate 150 and has a plurality of openings 172 to allow the light beam emitted from the light guide layer 110 to pass through, such that the light beam is only emitted from the openings 172 and only illuminates the light-transmissive icons 162*a* of the caps 162, and a light beam that is not emitted from the openings 172 keeps being transmitted in the light guide layer 110 until being emitted from the openings 172. In this way, a light utilization rate is improved, and light leakage is prevented. In this embodiment, the light-shielding layer 170 may be adhered onto the second surface 110*b* and the circuit layer 140 of the light guide layer 110. In another embodiment not shown herein, the light-shielding layer 170 may be omitted to allow luminescence of the whole luminous keyboard 100.

Figure 3:
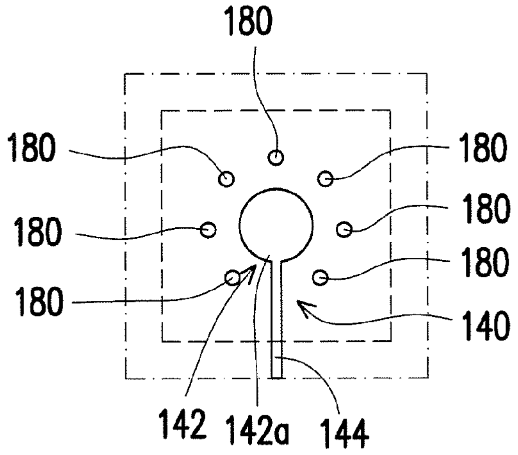
FIG. 3 is an enlarged view of an X portion shown in FIG. 2.

FIG. 3 is an enlarged view of an X portion shown in FIG. 2. Referring to FIGS. 1, 2, and 3, the luminous keyboard 100 may further include a plurality of microstructures 180. The microstructures 180 are located on the second surface 110*b* of the light guide layer 110 and surround the switches 142, such that the light beam in the light guide layer 110 is guided to the light-transmissive icons 162*a* of the mechanical keys 160. In this embodiment, the microstructures 180 may be formed on the second surface 110*b* of the light guide layer 110 by printing or ink-jetting. A material of the microstructures 180 includes a transparent material and a plurality of scattering particles distributed in the transparent material. In other embodiments, the microstructures 180 may also be located on the first surface 110*a* of the light guide layer 110, or located on the first surface 110*a* and the second surface 110*b* of the light guide layer 110 at the same time. The invention is not limited thereto.

Referring to FIG. 1 again, in correspondence to different circuit operations, such as resistive, capacitive, or electromagnetic circuit operations, etc., the switches 142 of the circuit layer 140 have a pattern corresponding to a circuit operation. In this embodiment, the switch 142 includes an electrode 142*a*, and the luminous keyboard 100 may have another electrode 190 located on the mechanical key 160 and using the shrinking path of the mechanical key 160 to change a distance between the electrode 142*a* and the electrode 190, thereby causing a capacitive change between the electrode 142*a* and the electrode 190 to generate the trigger signal.

Figure 4:
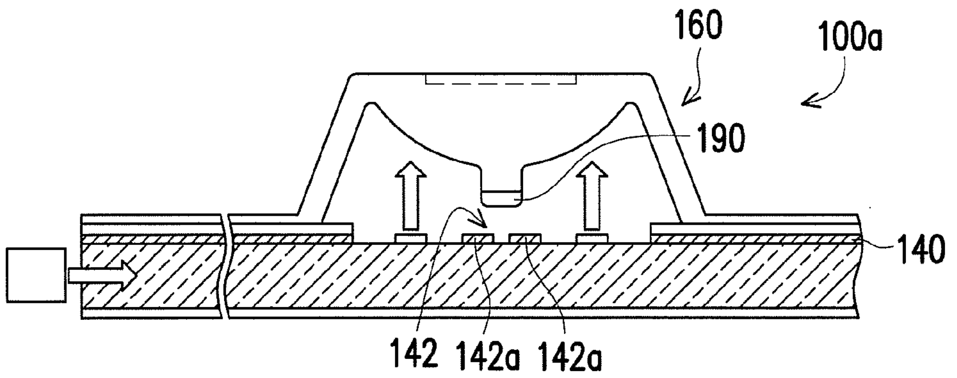
FIG. 4 is a partial sectional view of a luminous keyboard according to another embodiment of the invention.

FIG. 4 is a partial sectional view of a luminous keyboard according to another embodiment of the invention. Referring to FIG. 4, in a luminous keyboard 100*a* of this embodiment, the switch 142 of the circuit layer 140 includes a pair of electrodes 142*a*, and the luminous keyboard 100*a* may have the electrode 190 located on the mechanical key 160. Therefore, the mechanical key 160 shrinks to make the electrode 190 on the mechanical key 160 contact the pair of electrodes 142*a* at the same time, causing a resistive change between the electrodes 142*a* and the electrode 190 and thus generating the trigger signal.

Figure 5:
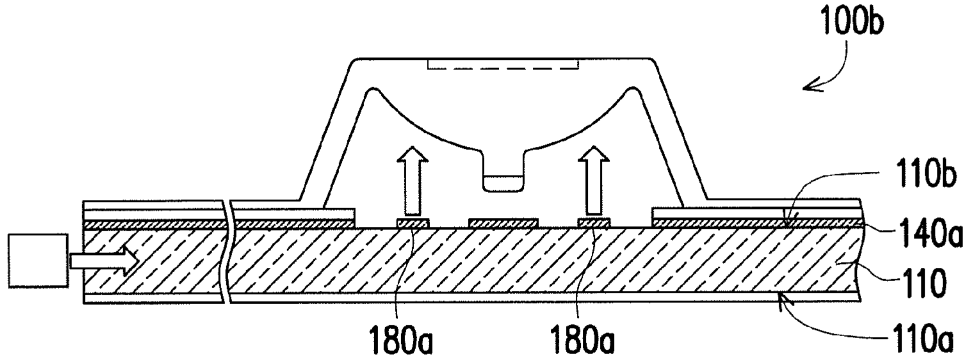
FIG. 5 is a partial sectional view of a luminous keyboard according to still another embodiment of the invention.

FIG. 5 is a partial sectional view of a luminous keyboard according to still another embodiment of the invention. Referring to FIG. 5, in a luminous keyboard 100*b* of this embodiment, a plurality of microstructures 180*a* may be formed at the same time when a circuit layer 140*a* is formed on the second surface 110*b* of the light guide layer 110 by printing or ink-jetting. Therefore, the circuit layer 140*a* and the microstructures 180*a* have the same material, namely a transparent conductive material and a plurality of scattering particles distributed in the transparent conductive material. In this way, the circuit layer 140*a* and the microstructures 180*a* may be formed in a single step, thus helping reduce manufacturing steps. In other embodiments, the microstructures 180*a* may be located on the first surface 110*a* of the light guide layer 110, or located on the first surface 110*a* and the second surface 110*b* of the light guide layer 110 at the same time. The invention is not limited thereto.

Figure 6:
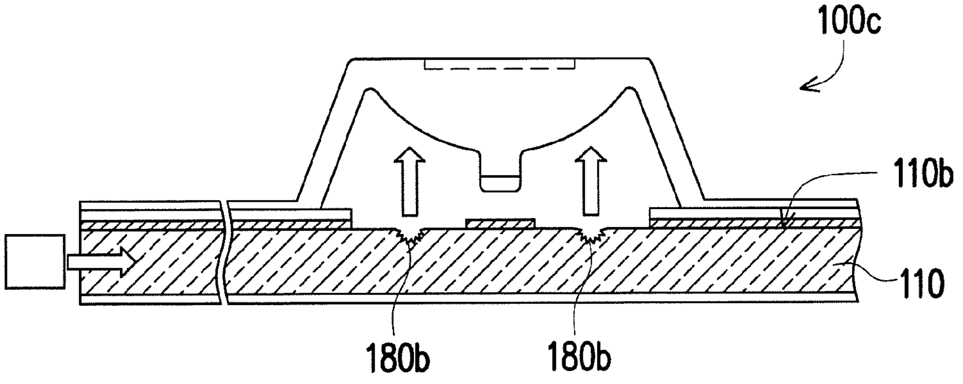
FIG. 6 is a partial sectional view of a luminous keyboard according to yet another embodiment of the invention.

FIG. 6 is a partial sectional view of a luminous keyboard according to yet another embodiment of the invention. Referring to FIG. 6, in a luminous keyboard 100*c* of this embodiment, a plurality of microstructures 180*b* include a plurality of concave or convex microstructures located on the second surface 110*b* of the light guide layer 110. Further, the microstructures 180*b* may be formed of a plurality of concave or convex microstructures of the light guide layer 110 on the second surface 110*b*. In FIG. 6, a concave structure having a finner-grained concave-and-convex structure is shown.

In view of the foregoing, the embodiments above of the invention at least has one of the following preferable characteristics: the support function is provided with use of the light guide layer and the key fixing plate only, so the metallic support element conventionally located below the light guide layer may be omitted, thus helping reduce the overall thickness and weight of the luminous keyboard. In addition, compared to the conventional flexible printed circuit (FPC), which is disposed on the light guide layer, the circuit layer of the invention, which is directly formed on the light guide layer, may save the thickness and weight of at least one dielectric layer. Furthermore, the circuit layer and microstructures may be made of the same material and formed on the light guide layer at the same time in a single step, thus helping reduce the manufacturing steps and assembling cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A luminous keyboard, comprising:
- a light guide layer having a first surface, a second surface opposite to the first surface, and a light incident surface connecting the first surface and the second surface;
- a light source disposed beside the light incident surface and generating a light beam to the light guide layer through the light incident surface;
- a reflecting layer disposed beside the first surface of the light guide layer;
- a circuit layer formed on the second surface of the light guide layer and having a plurality of switches;
- a key fixing plate fixed to the second surface of the light guide layer;
- a plurality of mechanical keys connected to the key fixing plate and disposed on the switches, each of the mechanical keys triggering the corresponding switch when being pressed; and
- a plurality of microstructures located on the second surface of the light guide layer and surrounding the switches, and the microstructures are not spatially overlapped with the switches, so as to guide the light beam in the light guide layer to the mechanical keys.

2. The luminous keyboard as claimed in claim 1, further comprising:
- a light-shielding layer disposed between the light guide layer and the key fixing plate, the light-shielding layer having a plurality of openings to allow the light beam emitted from the light guide layer to pass through.

3. The luminous keyboard as claimed in claim 1, wherein a material of the microstructures comprises a transparent material and a plurality of scattering particles distributed in the transparent material.

4. The luminous keyboard as claimed in claim 1, wherein a material of the circuit layer and the microstructures comprises a transparent conductive material and a plurality of scattering particles distributed in the transparent conductive material.

5. The luminous keyboard as claimed in claim 1, wherein the microstructures comprise a plurality of concave or convex microstructures located on the second surface of the light guide layer.

6. The luminous keyboard as claimed in claim 1, wherein a material of the light guide layer comprises a macromolecular compound or glass.

7. The luminous keyboard as claimed in claim 1, wherein a material of the light guide layer comprises polymethylmethacrylate (PMMA) or polycarbonate (PC).

8. The luminous keyboard as claimed in claim 1, wherein a material of the circuit layer comprises a conductive silver paste, indium-tin-oxide (ITO), or a conductive resin.

9. The luminous keyboard as claimed in claim 1, wherein each of the mechanical keys has a cap, the cap has a light-transmissive icon, and the light beam from the light guide layer is capable of illuminating the light-transmissive icon.

* * * * *